(12) United States Patent
Foti et al.

(10) Patent No.: US 11,745,795 B2
(45) Date of Patent: Sep. 5, 2023

(54) JOINT ASSEMBLY

(71) Applicant: Dana Automotive Systems Group, LLC, Maumee, OH (US)

(72) Inventors: Nicholas J. Foti, Toledo, OH (US); Ali Mousavi Saeedy, Rochester Hills, MI (US); Rachel C. Doctor, Van Wert, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 524 days.

(21) Appl. No.: 16/937,630

(22) Filed: Jul. 24, 2020

(65) Prior Publication Data
US 2021/0024127 A1    Jan. 28, 2021

Related U.S. Application Data

(60) Provisional application No. 62/878,132, filed on Jul. 24, 2019.

(51) Int. Cl.
| | |
|---|---|
| *F16C 11/06* | (2006.01) |
| *B62D 7/16* | (2006.01) |
| *B62D 7/18* | (2006.01) |

(52) U.S. Cl.
CPC ............... *B62D 7/16* (2013.01); *B62D 7/18* (2013.01); *F16C 11/068* (2013.01); *F16C 11/0652* (2013.01); *F16C 11/0666* (2013.01)

(58) Field of Classification Search
CPC ......... B60G 2206/50; B62D 7/18; B62D 7/16
See application file for complete search history.

(56) References Cited

U.S. PATENT DOCUMENTS

| | | | | |
|---|---|---|---|---|
| 3,472,331 A | * | 10/1969 | Baker ................. | B60K 17/306 180/254 |
| 3,542,392 A | * | 11/1970 | Cumming ............. | B62D 7/18 384/396 |
| 4,195,862 A | * | 4/1980 | Specktor ............. | B60K 17/306 280/86.753 |

(Continued)

FOREIGN PATENT DOCUMENTS

| | | | | |
|---|---|---|---|---|
| DE | 19700569 | | 1/1998 | |
| EP | 3592999 B1 | * | 5/2021 | ............ B60G 7/005 |

OTHER PUBLICATIONS

Torque King 4 X 4, Short Ball Joint Life on Dodge AAM 925 Front, Axles, https://www.quad4x4.com/catalog/article/aamballjoints, retreived from the internet: on Sep. 28, 2020. (6 pages).

*Primary Examiner* — Paul N Dickson
*Assistant Examiner* — Maxwell L Meshaka
(74) *Attorney, Agent, or Firm* — Marshall & Melhorn, LLC

(57) ABSTRACT

A steer axle assembly for an axle including a first steering component, a second steering component, and a movable joint assembly coupled to the first steering component and the second steering component. The movable joint is configured for axial movement and rotational movement to provide for relative movement between the first and second steering components. The first steering component is produced from a first material having a first coefficient of thermal expansion. The second steering component is produced from a second material having a second coefficient of thermal expansion, wherein the second coefficient of thermal expansion is different from the first coefficient of thermal expansion.

20 Claims, 1 Drawing Sheet

(56) References Cited

U.S. PATENT DOCUMENTS

| | | | | |
|---|---|---|---|---|
| 5,192,100 | A | * | 3/1993 | Rumpel .................. B60G 15/07 280/124.154 |
| 5,195,605 | A | | 3/1993 | Wood |
| 5,316,332 | A | * | 5/1994 | Ingalls .................... B62D 17/00 280/86.756 |
| 5,868,409 | A | * | 2/1999 | Breuer ..................... B62D 7/18 280/124.125 |
| 6,010,272 | A | | 1/2000 | Littman |
| 6,042,294 | A | | 3/2000 | Urbach |
| 6,557,872 | B1 | | 5/2003 | Garrard |
| 6,616,156 | B1 | * | 9/2003 | Dudding .................. B62D 7/18 280/93.512 |
| 6,626,579 | B1 | * | 9/2003 | Silvasi ..................... B62D 7/18 384/537 |
| 6,702,397 | B2 | * | 3/2004 | Herffurth ................ B60B 27/00 301/105.1 |
| 6,729,633 | B1 | * | 5/2004 | Irwin ..................... B62D 17/00 280/86.75 |
| 7,296,332 | B2 | * | 11/2007 | Brinker ................... F16D 65/12 29/434 |
| 7,712,753 | B2 | | 5/2010 | McCann |
| 7,771,136 | B2 | | 8/2010 | Buhl |
| 10,358,165 | B2 | * | 7/2019 | Reid ..................... B60B 35/128 |
| 10,518,838 | B2 | * | 12/2019 | Chang .................... B62K 25/06 |
| 2005/0242540 | A1 | | 11/2005 | Gottschalk |
| 2017/0036693 | A1 | * | 2/2017 | Reid ....................... B60B 35/16 |
| 2017/0259875 | A1 | * | 9/2017 | Chang .................... B62K 25/16 |
| 2018/0017099 | A1 | | 1/2018 | Yamamoto |
| 2018/0215021 | A1 | * | 8/2018 | Hargrove ............ B25B 27/0035 |
| 2019/0003022 | A1 | * | 1/2019 | Cakrawala ................ B22C 9/22 |
| 2020/0040937 | A1 | * | 2/2020 | Parker .................. F16C 11/068 |

\* cited by examiner

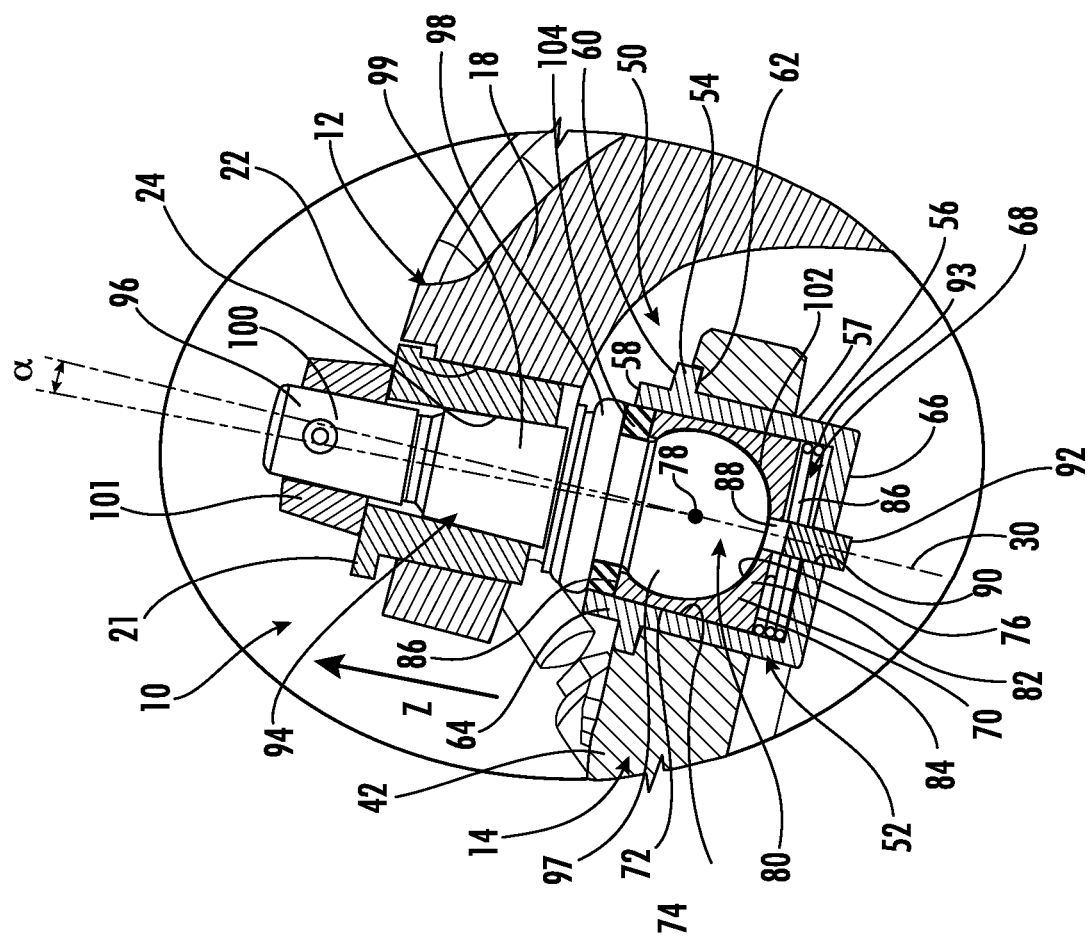
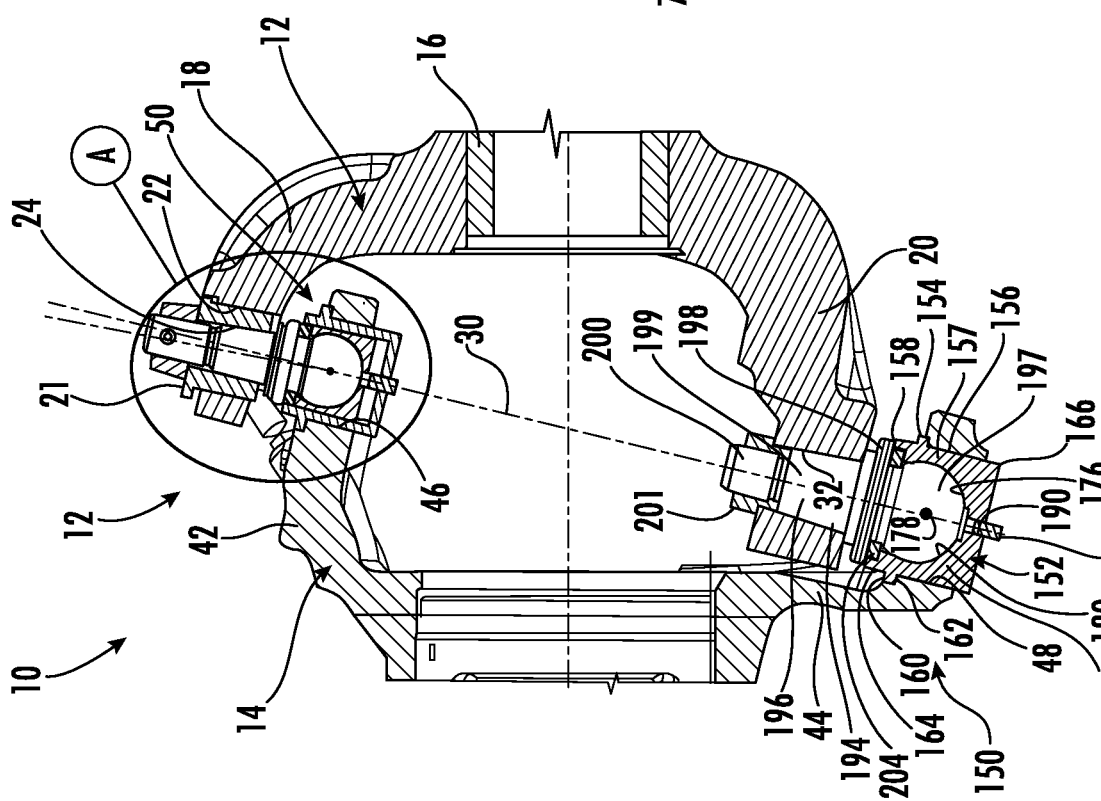
FIG. 1
FIG. 2

JOINT ASSEMBLY

RELATED APPLICATION

This U.S. non-provisional patent application claims priority to and the benefit of U.S. Provisional Patent Application Ser. No. 62/878,132 filed on Jul. 24, 2019, which is incorporated herein by reference in its entirety.

FIELD

The presently disclosed subject matter relates to a steer axle assembly, and more particularly to a joint assembly for the steer axle assembly.

BACKGROUND

A typical joint assembly for a steer axle includes a plurality of components, such as vehicle suspension members, steering knuckles, and the like, for example, which are interconnected for relative movement by joints (e.g. ball joints or pins). Each component of the joint assembly is typically manufactured to certain geometrical tolerances using certain materials. The manufacturing tolerances and materials of the components are critical for the proper alignment and interface thereof in the joint assembly.

Conventional joint assemblies, however, are not adaptable for a steer axle assembly which employs components with inadequate geometrical dimensional accuracies. This inaccuracy can be a result of limited manufacturing process capabilities or thermal deformation of components produced from materials having different coefficients of thermal expansion. As such, the components may not be properly aligned or interfaced to each other at extreme temperatures. This may result in excess loads and wear on the components, which may adversely affect the life and function of the joint assembly as well as the entire steer axle assembly.

In view of the foregoing disadvantages of the prior art, it would be desirable to produce a simple, innovative movable joint assembly which enhances a durability thereof and accommodates for geometrical dimensional errors resulting from either manufacturing processes or thermal expansion and contraction of surrounding components.

SUMMARY

In concordance and agreement with the present disclosure, a simple, innovative joint assembly which enhances a durability thereof and accommodates for geometrical dimensional errors resulting from either manufacturing processes or thermal expansion and contraction of surrounding components, has surprisingly been discovered.

In one embodiment, a steer axle assembly, comprises: a first steering component produced from a first material having a first coefficient of thermal expansion; a second steering component produced from a second material having a second coefficient of thermal expansion, wherein the second coefficient of thermal expansion is different from the first coefficient of thermal expansion; and a first joint assembly coupled to the first steering component and the second steering component, wherein the first joint assembly is configured for axial movement and rotational movement to provide for relative movement between the first and second steering components.

As aspects of certain embodiments, the first steering component is a steering yoke and the second steering component is a steering knuckle.

As aspects of certain embodiments, the first steering component is produced from a steel material and the second steering component is produced from a non-steel material.

As aspects of certain embodiments, the first joint assembly includes a socket coupled to one of the first steering component and the second steering component.

As aspects of certain embodiments, the first joint assembly includes a support member movably coupled to one of the first steering component and the second steering component, the support member having a cavity formed therein.

As aspects of certain embodiments, the first joint assembly further includes a movable member at least partially disposed in the cavity of the support member.

As aspects of certain embodiments, the steer axle assembly further comprises a sleeve coupled to the first steering component, where the sleeve is configured to receive at least a portion of the movable member.

As aspects of certain embodiments, the first joint assembly further includes a seal disposed adjacent at least one of the support member and the movable member.

As aspects of certain embodiments, the first joint assembly includes at least one fluid device to provide a flow of a fluid to within the first joint assembly.

As aspects of certain embodiments, the first joint assembly includes a dampener.

In another embodiment, an axle assembly, comprises: a first connecting component produced from a first material having a first coefficient of thermal expansion, wherein the first connecting component includes at least one aperture formed therein; a second connecting component produced from a second material having a second coefficient of thermal expansion, wherein the second coefficient of thermal expansion is different from the first coefficient of thermal expansion, and wherein the second connecting component includes at least one aperture formed therein; and a first joint assembly coupled to the first connecting component and the second connecting component, wherein the first joint assembly is configured for axial movement and rotational movement to provide for relative movement between the first and second connecting components caused by the different coefficients of thermal expansion, and wherein the first joint assembly includes a socket at least partially received in the at least one aperture of the second connecting component, a support member having a cavity formed therein and at least partially disposed in the socket, and a movable member at least partially disposed in the cavity of the support member.

As aspects of certain embodiments, the first connecting component is produced from a steel material and the second connecting component is produced from a non-steel material.

As aspects of certain embodiments, the axle assembly further comprises a sleeve coupled to the first steering component, where the sleeve is configured to receive at least a portion of the movable member.

As aspects of certain embodiments, the sleeve has a tapered aperture formed therethrough.

As aspects of certain embodiments, the first joint assembly includes at least one fluid device to provide a flow of a fluid to at least one of the socket, the support member, and the movable member.

As aspects of certain embodiments, the first joint assembly includes a dampener disposed between the socket and the support member.

As aspects of certain embodiments, the first joint assembly includes a seal disposed adjacent the socket, the support member, and the movable member.

As aspects of certain embodiments, the support member is in sliding engagement with the second connecting component to allow an axial movement of the support member along a center axis thereof in both a first direction and a second direction.

As aspects of certain embodiments, a portion of the movable member is in sliding engagement with the support member to permit rotational movement of the movable member therewithin.

As aspects of certain embodiments, the axle assembly further comprises a second joint assembly coupled to the first connecting component and the second connecting component, wherein the first joint assembly is configured for at least one of axial movement and rotational movement to provide for relative movement between the first and second connecting components caused by the different coefficients of thermal expansion.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure and do not illustrate all possible implementations thereof. The drawings are not intended to limit the scope of the present disclosure in any way.

FIG. 1 is a fragmentary cross-sectional view of a portion of a steer axle assembly including a movable joint assembly according an embodiment of the presently disclosed subject matter; and FIG. 2 is an enlarged fragmentary cross-sectional view of a portion of the steer axle assembly shown within circle A of FIG. 1.

DETAILED DESCRIPTION

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 illustrates a portion of a steer axle assembly 10 according to an embodiment of the presently disclosed subject matter. The steer axle assembly 10 includes a first connecting component 12 and a second connecting component 14. In certain embodiments, the first connecting component 12 is a steering yoke fixedly coupled to a frame or body (not depicted) of a vehicle (not depicted) and the second connecting component 14 is a steering knuckle. It should be appreciated that the connecting members 12, 14 can be any components intended to be interconnected, as desired.

The first connecting component 12 has a central portion 16 and upper first and lower second arms 18, 20, respectively. The first arm 18 of the first connecting component 12 has an aperture 22. A corresponding aperture 32 is formed in the second arm 20 of the first connecting component 12. The apertures 22, 32 are preferably centered on a first axis 30 of the steer axle assembly 10. In certain embodiments, the apertures 22, 32 may have a generally tapered cross-sectional shape. In other embodiments, a sleeve 21 may be disposed in the aperture 22, 32. An inner surface of the sleeve 21 defines a generally tapered cross-sectional shaped aperture 24.

In one embodiment, an engine driven shaft (not depicted) may extend through the central portion 16 of the first connecting component 12. The driven shaft is connected with a wheel (not depicted) of the vehicle supported for rotation on the second connecting component 14. The second connecting component 14 has an upper first arm 42 and a lower second arm 44. The first arm 42 of the second connecting component 12 has an aperture 46. The aperture 46 has a cylindrical configuration preferably centered on the first axis 30. A corresponding aperture 48 is formed in the second arm 44 of the second connecting component 14. The aperture 48 has a cylindrical configuration preferably centered on the first axis 30.

It should be appreciated that the apertures 22, 32 in the first connecting component 12 may not be coaxial due to manufacturing process limitation or design intent but may instead be misaligned. Similarly, the apertures 46, 48 in the second connecting component 14 also may not be coaxial, but may instead be misaligned by a few degrees a relative to each other and/or to the apertures 22, 32 in the first connecting component 12. Further, a distance between the first arm 18 of the first connecting component 12 and the first arm 42 of the second connecting component 14, as measured along the first axis 30, may vary.

In certain embodiments, the steer axle assembly 10 includes a floating or movable first joint assembly 50 for supporting the first connecting component 12 for both rotational and axial movements along the first axis 30 relative to the second connecting component 14. The first joint assembly 50 shown is an upper joint of the steer axle assembly 10, however in certain embodiments (not depicted) it can be a lower joint. It should be appreciated that the first joint assembly 50 may be employed with any type of connecting components 12, 14 as desired. In certain embodiments, the first joint assembly 50 is configured to be utilized with connecting components 12, 14 produced from materials having different coefficients of thermal expansion. For example, the first joint assembly 50 may be used with a steer axle assembly 10 having the first connecting component 12 produced from a material having a first coefficient of thermal expansion such as a steel material, and the second connecting component 14 produced from a material having a second coefficient of thermal expansion such as a non-steel material (e.g. an aluminum or aluminum alloy). In a preferred embodiment, the first joint assembly 50 is advantageously employed to couple the first connecting component 12, being a steering yoke produced from the steel material, to the second connecting component 14, being a steering knuckle produced from the non-steel material, which is critical and necessary in producing a heavy-duty steer axle assembly with a lightweight knuckle that enhances performance and durability while a weight and cost of the steer axle assembly is reduced.

The first joint assembly 50, shown more clearly in FIG. 2, includes a socket 52 disposed in the aperture 46 of the second connecting component 14. The socket 52 shown has a generally cylindrical shape. It is understood, however, that the socket 52 may have any size and shape as desired. It is further understood that the socket 52 may be formed from any suitable material as desired such as a metal or a non-metal material, for example. It is further understood that the socket 52 may be manufactured through any suitable manufacturing process for example stamping or forging or powder metal processing, etc. A mounting flange 54 extends radially outward from an outer peripheral surface 56 of a side wall 57 of the socket 52. The mounting flange 54 is formed at an open end 58 of the socket 52 and has substantially parallel, radially extending first and second surfaces 60, 62. A rim 64 of the socket 52 projects from the first surface 60 of the mounting flange 54. A radially extending end wall 66 of the socket 52 is located opposite the rim 64 and defines a closed end of the socket 52.

The side wall 57 and end wall 66 of the socket 52 define a chamber 68 in the socket 52. A support member 70 is disposed within the chamber 68. It should be appreciated that the support member 70 may be any suitable support member as desired such as a bushing, a bearing, a plunger, and the like, for example. Various types of materials such a metal material, a non-metal material (e.g. plastic or ceramic), or a combination thereof, may be used to form the support member 70 if desired. As illustrated, an outer peripheral surface 72 of the support member 70 has a generally cylindrical shape. It is understood that the support member 70 may have any suitable shape and size as desired. Although the support member 70 shown in FIGS. 1-2 is disposed in the socket 52, it is understood that the support member 70 may be directly disposed in the aperture 46 of the second connecting component 14 without the socket 52. In other embodiments, the support member 70 and the socket 52 may be formed as a unitary structure.

The outer peripheral surface 72 of the support member 70 is in sliding engagement with an inner peripheral surface 74 of the side wall 57 of the socket 52. In certain embodiments, the support member 70 has a spherical inner surface 76 centered on a pivot center 78 and defining a spherical cavity 80 in the support member 70. The support member 70 includes a radially extending inner end wall 82 having a first outer surface 84. The first outer surface 84 is spaced apart from the end wall 66 of the socket 52, defining an open space 86 therebetween. In certain embodiments, each of the end wall 82 of the support member 70 and the end wall 66 of the socket 52 include apertures 88, 90, respectively, formed therein. The apertures 88, 90 are configured to receive a fluid device 92 therein to provide a fluid (e.g. a lubricant) to at least one of the chamber 68 of the socket 52 and the cavity 80 of the support member 70. For example, the fluid device 92 may be a lubricant fitting (e.g. a grease Zerk fitting) to provide the lubricant (e.g. grease) to the first joint assembly 50. In other certain embodiments, a dampener 93 (depicted only in FIG. 2) may be disposed within the open space between the end wall 82 of the support member 70 and the end wall 66 of the socket 52. Various types of dampeners 93 may be employed such as a biasing member (e.g. a spring) or a flowable material, for example. The dampener 93 is configured to provide a desired dampening or slight resistance against forces applied to the movable joint assembly 50 to subdue an adverse effect of those forces on the movable joint assembly 50 as well as the steer axle assembly 10.

In one embodiment, the support member 70 includes a second outer surface 86 opposite the first outer surface 84 of the end wall 82. The second outer surface 86 of the support member 70 is substantially coplanar with the first surface 60 of the mounting flange 54 of the socket 52, when the first joint assembly 50 is in the position as shown in FIG. 2. It is however understood that support member 70 does not require the second outer surface 86 and instead may only be comprised of the one outer surface 84 depending on the type of support member 70 that is employed. It is further understood that at least one of the outer surfaces 84, 86 of the support member 70 may be formed from any suitable material to permit the at least one of the outer surfaces 84, 86 to provide the desired dampening or resistance. In certain embodiments, the at least one of the outer surfaces 84, 86 may be formed from an elastomeric material or substantially flexible plastic material, if desired.

As illustrated, the first joint assembly 50 also includes a floating or movable member 94. The movable member 94 has a stem or elongated first portion 96 and a spherical second portion 97. The first portion 96 includes a boot or seal 98 formed between the first and second portions 96, 97, a tapered second section 99, and a threaded third section 100 disposed about a longitudinal axis of the movable member 94. As shown in FIG. 2, the longitudinal axis of the movable member 94 extends through the pivot center 78 of the support member 70. The first portion 96 projects from the second portion 97 and the support member 70, away from the open end 58 of the socket 52, into and through the aperture 22 formed in the first connecting component 12. In certain other embodiments, the second section 99 of the first portion 96 is disposed into and through the aperture 24 formed in the sleeve 21. A coupling mechanism 101 (e.g. a nut) may be disposed on the threaded third section 100 of the first portion 96 of the movable member 94 to fixedly coupled the movable member 94 to the first connecting component 12. It should be appreciated that the movable member 94 can be fixedly coupled to the first connecting component 12 by various other suitable methods as desired.

In the embodiment shown, the second portion 97 of the movable member 94 is received in the cavity 80 formed in the support member 70. An outer surface 102 of the second portion 97 is in sliding engagement or bearing engagement with the inner surface 76 of the support member 70. The support member 70 permits relative movement between the first arm 18 of the first connecting component 12 and the first arm 42 of the second connecting component 14. More particularly, the support member 70 of the presently disclosed subject matter permits axial degrees of freedom of movement of the first joint assembly 50 (i.e. axial movement of the support member 70 along a center axis thereof in both directions) and sliding engagement between the support member 70 and the socket 52 as well as maintaining all rotational degrees of freedom of movement (e.g. yaw, pitch, and roll) of the movable member 94 within the support member 70. It is understood that the center axis of the support member 70 may also be a longitudinal axis of the support member 70 or the first axis 30 of the first joint assembly 50. Accordingly, the support member 70 permits the first joint assembly 50 to adapt for geometrical errors as a result of manufacturing or different coefficients of thermal expansion of the materials employed in the steer axle assembly 10.

A retainer 104 may be disposed between the socket 52 and the movable member 94. In certain embodiments, the retainer 104 may be interposed between the support member 50 and the seal 98 of the movable member 94 within the socket 52. It is understood that the seal 98 may be formed from an elastomeric material. The elastomeric material of the seal 98 thus forms a substantially fluid-tight seal between the socket 52 and the movable member 94 to militate against contaminants and other foreign material from entering the socket 52.

A generally constrained movable second joint assembly 150 connects the second arm 20 of the first connecting component 12 and the second arm 44 of the second connecting component 14. In one embodiment, the second joint assembly 150 has substantially similar structure as that of the first joint assembly 50, as shown more clearly in FIG. 2 with only one exception i.e. the second joint assembly 150 provides only the three rotational degrees of freedom of movement (e.g. yaw, pitch, and roll) and no axial degree of freedom of movement, as described in detail hereinabove.

Further, the second joint assembly 150 shown is a lower joint of the joint assembly 10, however in certain embodiments (not depicted) the second joint assembly 150 may be the upper joint.

Referring to FIG. 1, the second joint assembly 150 includes a socket 152 disposed in the aperture 48 of the second connecting component 14. The socket 152 shown has a generally cylindrical shape. It is understood, however, that the socket 152 may have any size and shape as desired. It is further understood that the socket 152 may be formed from any suitable material as desired such as a metal or a non-metal material, for example. A mounting flange 154 extends radially outward from an outer peripheral surface 156 of a side wall 157 of the socket 152. The mounting flange 154 is formed at an open end 158 of the socket 152 and has substantially parallel, radially extending first and second surfaces 160, 162. A rim 164 of the socket 152 projects from the first surface 160 of the mounting flange 154. A radially extending end wall 166 of the socket 152 is located opposite the rim 164 and defines a closed end of the socket 152.

In certain embodiments, the socket 152 has a spherical inner surface 176 centered on a pivot center 178 and defining a spherical cavity 180 in the socket 152. As shown in FIG. 1, the end wall 166 of the socket 152 may include an aperture 190 formed therein. The aperture 190 is configured to receive a fluid device 192 therein to provide a fluid (e.g. a lubricant) to the socket 152 and the cavity 180 formed therein. For example, the fluid device 192 may be a lubricant fitting (e.g. a grease Zerk fitting) to provide the lubricant (e.g. grease) to the second movable joint 150.

The second joint assembly 150 also includes a movable member 194. The movable member 194 has a stem or elongated first portion 196 and a spherical second portion 197. The first portion 196 includes a boot or seal 198 formed between the first and second portions 196, 197, a tapered second section 199, and a threaded third section 200 disposed about a longitudinal axis of the movable member 194. The longitudinal axis of the movable member 194 extends through the pivot center 178 of the socket 152. The first portion 196 projects from the second portion 197 and the socket 152, away from the open end 158 of the socket 152, into and through the aperture 32 formed in the first connecting component 12. In certain other embodiments, the second section 199 of the first portion 196 is disposed into and through a sleeve (not depicted) disposed in the aperture 32 of the first connecting component 12. A coupling mechanism 201 (e.g. a nut) may be disposed on the threaded third section 200 of the first portion 196 of the movable member 194 to fixedly coupled the movable member 194 to the first connecting component 12. It should be appreciated that the movable member 194 can be fixedly coupled to the first connecting component 12 by various other suitable methods as desired.

In the embodiment shown, the second portion 197 of the movable member 194 is received in the cavity 180 formed in the socket 152. An outer surface 202 of the second portion 197 is in sliding engagement or bearing engagement with the inner surface 176 of the socket 152. The socket 152 permits relative movement between the second arm 20 of the first connecting component 12 and the second arm 44 of the second connecting component 14.

A retainer 204 may be disposed between the socket 152 and the movable member 194. In certain embodiment, the retainer 204 may be interposed between the socket 152 and the seal 198 of the movable member 194 within the socket 152. It is understood that the seal 198 may be formed from an elastomeric material. The elastomeric material of the seal 198 thus forms a substantially fluid-tight seal between the socket 152 and the movable member 194 to militate against contaminants and other foreign material from entering the socket 152.

In another embodiment, the second joint assembly 150 may be any conventional joint such as a conventional ball joint as is commonly known.

In another embodiment, the steer axle assembly 10 may comprise only a single joint instead of upper and lower joints, wherein the single joint is the first joint assembly 50.

In yet another embodiment, the first joint assembly 50 may be employed for both the upper and lower joints of the steer axle assembly 10.

In assembly of the steer axle assembly 10, the first joint assembly 50 is secured to the first arm 42 of the second connecting component 14 and the second joint assembly 150 is secured to the second arm 44 of the second connecting component 14. Particularly, the socket 52 of the first joint assembly 50 is disposed into the aperture 46 formed in the first arm 42 of the second connecting component 14. Similarly, the socket 152 of the second joint assembly 150 is disposed in the aperture 48 formed in the second arm 44 of the second connecting component 14. Thus, the first and second joint assemblies 50, 150, respectively, are secured to the second connecting component 14.

The second connecting component 14 is then connected with the first connecting component 12. The first portion 96 of the movable member 94 of the first joint assembly 50 is positioned to extend into the aperture 22 formed in the first connecting component 12 and the first portion 196 of the movable member 194 of the second joint assembly 150 is positioned to extend into the aperture 32 formed in the first connecting component 12. A nut 101 is screwed onto the threaded third section 100 of the movable member 94, securing the first joint assembly 50 to the first connecting component 12. Similarly, a nut 201 is screwed onto the threaded third section 200 of the movable member 194, securing the second joint assembly 150 to the first connecting component 12.

When the second joint assembly 150 is assembled between the second arms 20, 44 of the first and second connecting components 12, 14, respectively, a distance between the first arms 18, 42 of the first and second connecting components 12, 14, respectively, as measured along the first axis 30, may vary because of differing coefficients of thermal expansion of the first and second connecting components 12, 14. This variability in the thermal expansion of the first and second connecting components 12, 14 is accommodated by movement of the support member 70 and the movable member 94 in the socket 52 of the first joint assembly 50, in an axial direction substantially parallel to the first axis 30.

Specifically, if the distance between the first arms 18, 42 of the first and second connecting components 12, 14, respectively, as measured along the first axis 30, is relatively large because of the difference in the thermal expansion of the first and second connecting components 12, 14, then the support member 70 of the first joint assembly 50 translates to a first position shown in FIG. 2. In the first position, the movable member 94 and the support member 70 are positioned in the socket 52 so that the support member 70 is in engagement with or in relatively close engagement with the retainer 104 or the seal 98 of the movable member 94.

On the contrary, if the distance between the first arms 18, 42 of the first and second connecting components 12, 14, respectively, as measured along the steering axis 30, is relatively small because of the difference in the thermal expansion of the first and second connecting components 12, 14, then the support member 70 of the first joint assembly 50 translates to a second position (not depicted). In the second position, the movable member 94 and the support member 70 are positioned in the socket 52 so that the support member 70 is in engagement with or in relatively close engagement with the dampener or the end wall 66 of the socket 52.

Therefore, because the movable member 94 and the support member 70 can move axially in the socket 52 of the first joint assembly 50, the first and second connecting components 12, 14 may be produced from materials having different coefficients of thermal expansion.

Further, when the joint assembly 10 is assembled, the apertures 22, 32 in the first connecting component 12 should be in substantially coaxial alignment, along the first axis 30, with each other and with both the apertures 46, 48 in the second connecting component 14. Also, the geometrical dimensions of the mounting surfaces of the upper and lower joints should be controlled very accurately. Because of manufacturing limitation, the alignment along the first axis 30, of the apertures 22, 32, 46, 48 may not be coaxial, but varying to different degrees. Such misalignment of the first and second connecting components 12, 14 combined with geometrical errors as a result of both manufacturing process limitation and thermal deformation, could place undesired excess loads on the joint assembly 10 once it is assembled.

By employing the first joint assembly 50, however, the undesirable loads are minimized because the movable member 94 of the first joint assembly 50 provides an additional degree of freedom of movement relative to the support member 70 of the first joint assembly 50, and more particularly, the axial movement along the center axis of the support member 70.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A steer axle assembly, comprising:
   a first steering component produced from a first material having a first coefficient of thermal expansion;
   a second steering component produced from a second material having a second coefficient of thermal expansion, wherein the second coefficient of thermal expansion is different from the first coefficient of thermal expansion; and
   a first joint assembly coupled to the first steering component and the second steering component, wherein the first joint assembly is configured for axial movement and rotational movement to provide for relative movement between the first and second steering components.

2. The steer axle assembly of claim 1, wherein the first steering component is a steering yoke and the second steering component is a steering knuckle.

3. The steer axle assembly of claim 1, wherein the first steering component is produced from a steel material and the second steering component is produced from a non-steel material.

4. The steer axle assembly of claim 1, wherein the first joint assembly includes a cylindrically shaped socket coupled to one of the first steering component and the second steering component, wherein the socket has a spherical inner surface.

5. The steer axle assembly of claim 1, wherein the first joint assembly includes a support member movably coupled to one of the first steering component and the second steering component, the support member having a cavity formed therein.

6. The steer axle assembly of claim 5, wherein the first joint assembly further includes a movable member at least partially disposed in the cavity of the support member.

7. The steer axle assembly of claim 6, further comprising a sleeve coupled to the first steering component, where the sleeve is configured to receive at least a portion of the movable member.

8. The steer axle assembly of claim 6, wherein the first joint assembly further includes a seal disposed adjacent at least one of the support member and the movable member.

9. The steer axle assembly of claim 1, wherein the first joint assembly includes at least one fluid device to provide a flow of a fluid to within the first joint assembly.

10. The steer axle assembly of claim 1, wherein the first joint assembly includes a dampener.

11. An axle assembly, comprising:
    a first connecting component produced from a first material having a first coefficient of thermal expansion, wherein the first connecting component includes at least one aperture formed therein;
    a second connecting component produced from a second material having a second coefficient of thermal expansion, wherein the second coefficient of thermal expansion is different from the first coefficient of thermal expansion, and wherein the second connecting component includes at least one aperture formed therein; and
    a first joint assembly coupled to the first connecting component and the second connecting component, wherein the first joint assembly is configured for axial movement and rotational movement to provide for relative movement between the first and second connecting components caused by the different coefficients of thermal expansion, and wherein the first joint assembly includes a socket at least partially received in the at least one aperture of the second connecting component, a support member having a cavity formed therein and at least partially disposed in the socket, and a movable member at least partially disposed in the cavity of the support member.

12. The axle assembly of claim 11, wherein the first connecting component is produced from a steel material and the second connecting component is produced from a non-steel material.

13. The axle assembly of claim 11, further comprising a sleeve coupled to the first steering component, where the sleeve is configured to receive at least a portion of the movable member.

14. The axle assembly of claim 13, wherein the sleeve has a tapered aperture formed therethrough.

15. The axle assembly of claim 11, wherein the first joint assembly includes at least one fluid device to provide a flow of a fluid to at least one of the socket, the support member, and the movable member.

16. The axle assembly of claim 11, wherein the first joint assembly includes a dampener disposed between the socket and the support member.

17. The axle assembly of claim 11, wherein the first joint assembly includes a seal disposed adjacent the socket, the support member, and the movable member.

18. The axle assembly of claim 11, wherein the support member is in sliding engagement with the second connecting component to allow an axial movement of the support member along a center axis thereof in both a first direction and a second direction.

19. The axle assembly of claim 11, wherein a portion of the movable member is in sliding engagement with the support member to permit rotational movement of the movable member therewithin.

20. The axle assembly of claim 11, further comprising a second joint assembly coupled to the first connecting component and the second connecting component, wherein the first joint assembly is configured for at least one of axial movement and rotational movement to provide for relative movement between the first and second connecting components caused by the different coefficients of thermal expansion.

\* \* \* \* \*